March 28, 1939.  C. SLATER  2,152,158
COTTON STALK CUTTER
Filed May 3, 1938  2 Sheets-Sheet 1
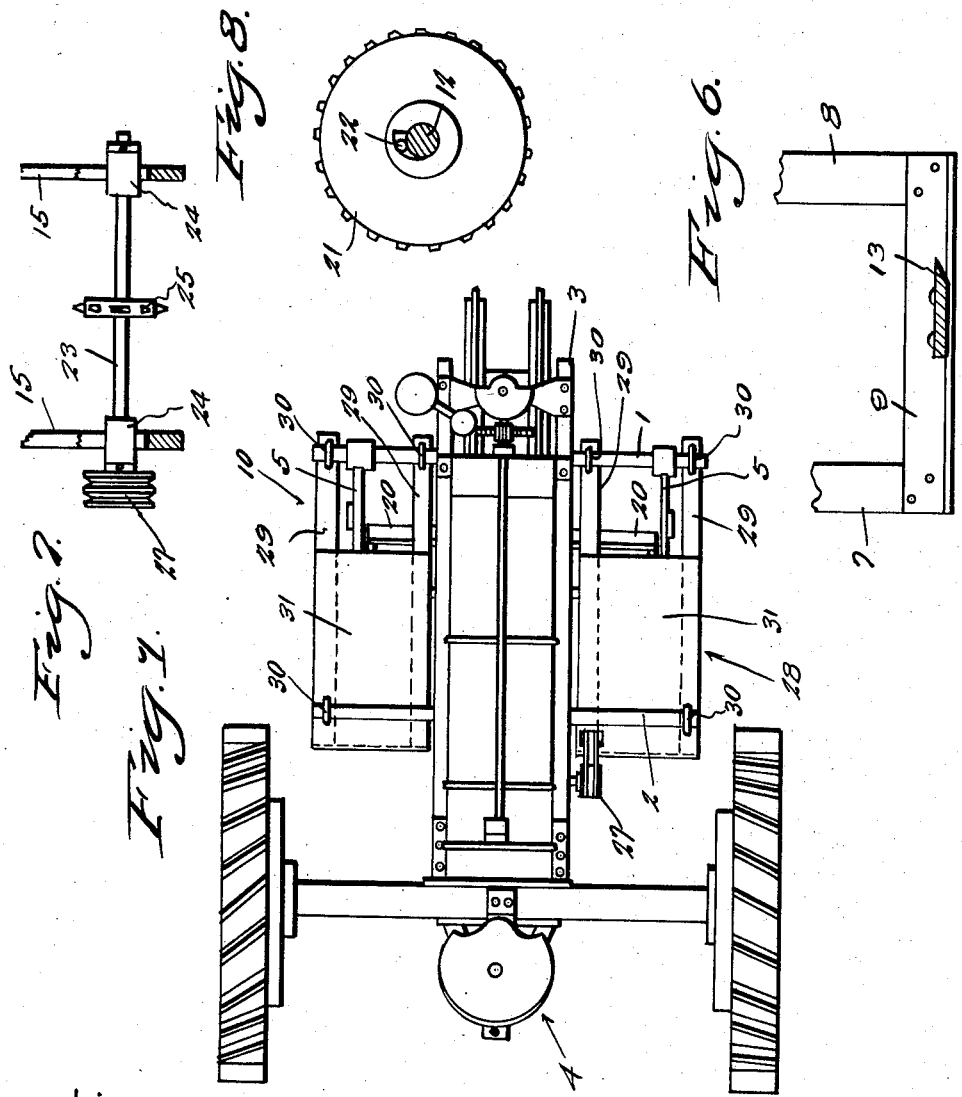
Inventor
Clarence Slater
By *Clarence A. O'Brien*
*Hyman Berman*
Attorneys

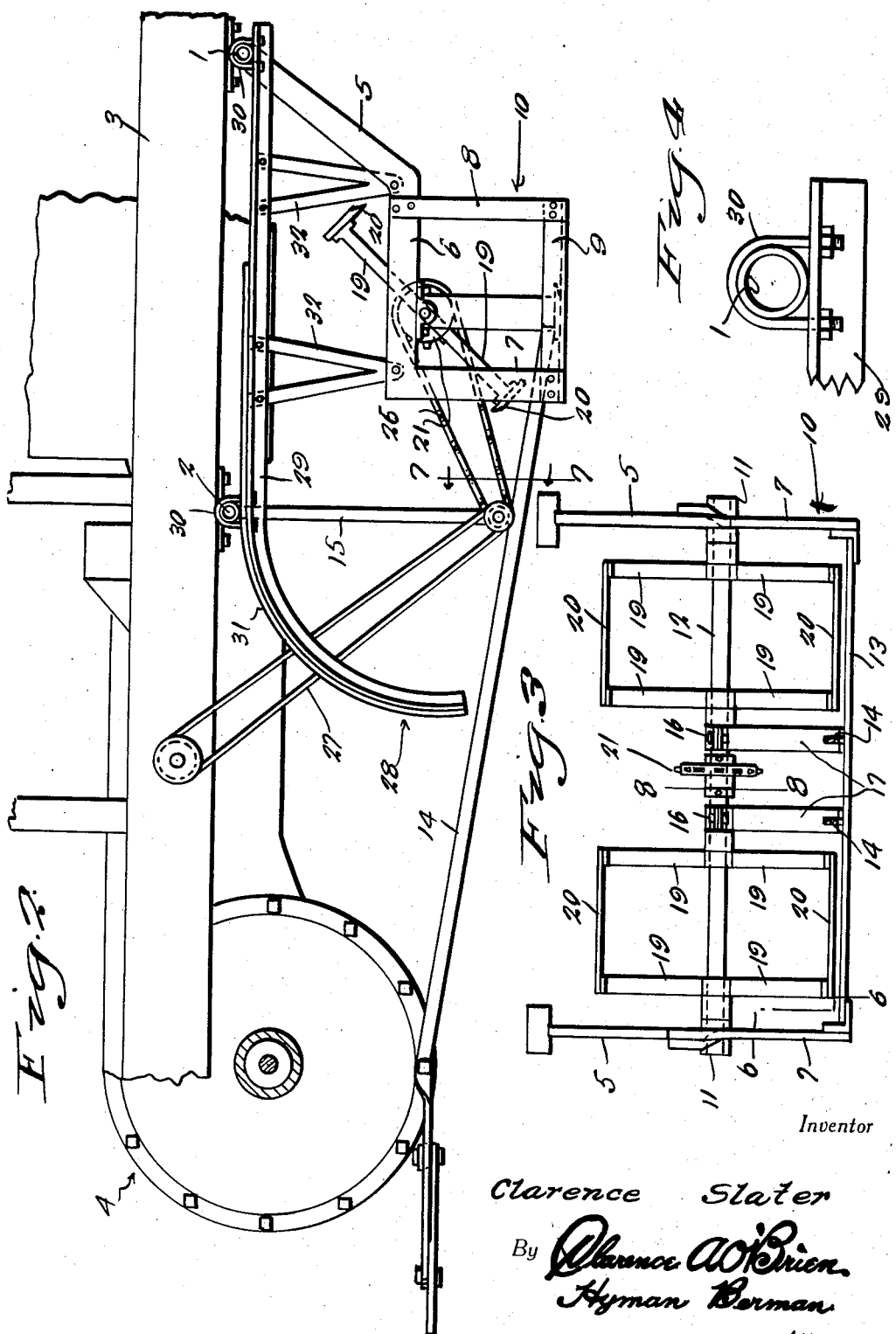

Patented Mar. 28, 1939

2,152,158

UNITED STATES PATENT OFFICE 2,152,158

COTTON STALK CUTTER

Clarence Slater, Lewisville, Tex.

Application May 3, 1938, Serial No. 205,827

1 Claim. (Cl. 56—15)

The present invention relates to new and useful improvements in cotton stalk cutters and has for its primary object to provide, in a manner as hereinafter set forth, a device of this character embodying a novel construction and arrangement of blades whereby the stalks, regardless of the size thereof, will be chopped into small pieces.

Another very important object of the invention is to provide a stalk cutter of the aforementioned character which is adapted to be mounted for operation on a conventional tractor.

Still another very important object of the invention is to provide a stalk cutter of the character described which is adapted to operate on two rows of stalks at a time.

Other objects of the invention are to provide a stalk cutter of the character set forth which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view of an embodiment of the invention, showing said invention installed on a tractor.

Figure 2 is a view in side elevation thereof.

Figure 3 is an elevational view of what may be referred to as the cutting unit.

Figure 4 is a detail view in elevation of one of the supporting members for the shields.

Figure 5 is a detail view in end elevation of one of the rotary blades.

Figure 6 is a vertical sectional view, taken substantially on the line 6—6 of Fig. 3.

Figure 7 is a cross sectional view, taken substantially on the line 7—7 of Fig. 2.

Figure 8 is a vertical sectional view, taken substantially on the line 8—8 of Fig. 3.

Referring now to the drawings in detail, it will be seen that the embodiment of the invention which has been illustrated comprises front and rear tubular bars 1 and 2, respectively, which are mounted transversely beneath the frame 3 of a conventional tractor which is designated generally by the reference numeral 4. The reference numeral 5 designates a pair of angular beams having their forward ends connected to the front bar 1, said beams including horizontal intermediate portions 6 terminating in downturned end portions 7. Depending from the beams 6 at an intermediate point are bars 8. Extending longitudinally between the lower end portions of the bars 8 and the lower end portions of the portions 7 of the beams 5 are bars 9. The elements 5 to 9, inclusive, provide a frame structure which is designated generally by the reference numeral 10. Bearings 11 are provided on the frame structure 10 and journalled therein are the end portions of a transverse shaft 12.

Extending horizontally between the members 9 of the frame structure 10 is a transverse stationary knife 13. Braces 14 extend from intermediate portions of the stationary knife 13 to the rear end portion of the tractor 4. Hangers 15 from the bar 2 support the braces 14 at intermediate points. The shaft 12 is supported at intermediate points in bearings 16 on the upper ends of uprights 17 which rise from the stationary knife 13. Pairs of arms 19 are fixed on the shaft 12 and extending between said arms are rotary blades 20 which are adapted to coact with the stationary knife 13 for cutting the cotton stalks.

The reference numeral 21 designates a sprocket wheel which is mounted on the shaft 12 at an intermediate point. As illustrated to advantage in Fig. 8 of the drawings, the sprocket wheel 21 is connected to the shaft 12 for driving said shaft in one direction only through the medium of an overrunning clutch 22. The reference numeral 23 (see Fig. 7) designates a transverse shaft which is journalled in bearings 24 on the lower portions of the hangers 15. A sprocket wheel 25 is fixed on the shaft 23 at an intermediate point. A chain 26 is trained over the sprocket wheels 25 and 21 for driving the rotary blades 20 in one direction. The shaft 23 is driven from the power take-off of the tractor 4 by a belt and pulley connection 27.

The reference numeral 28 designates generally shields or guards which are provided on the machine rearwardly of and above the blades 20. The shields 28 comprise pairs of bars 29 secured to the bars 1 and 2 by U-bolts 30 (see Fig. 4). The bars 29 terminate in downwardly curved rear end portions. Metallic plates 31 are secured on the pairs of bars 29. The reference numeral 32 designates substantially V-shaped braces between the beams 5 and the outermost bars 29.

It is thought that the operation of the machine will be readily apparent from a consideration of the foregoing. As the tractor is driven over the ground, the stalks comprising two rows are chopped or cut into comparatively small pieces by the rapidly rotating blades 20. The speed of the blades accomplishes this. As hereinbefore stated, the blades 20 coact with the stationary knife 13 for severing the stalks near the ground, leaving a short stub. The blades 20 are driven at the desired speed from the usual power take-off of the tractor 4 through the belt and pulley drive 27, the chain 26, etc. By reason of the overrunning clutch 22, the blades 20 are free to continue to rotate in a forward direction when the tractor stops.

It is believed that the many advantages of a cotton stalk cutter constructed in accordance with the present invention will be readily understood and although a preferred embodiment of the machine is as illustrated and described, it is to be understood that changes in the details of construction and in the combination and arrangement of parts may be resorted to which will fall within the scope of the invention as claimed.

What is claimed is:

In combination with a tractor including a frame, a pair of bars mounted transversely beneath the frame at longitudinally spaced points, a pair of angular beams having one end connected to the front bar and extending rearwardly and downwardly therefrom, bars mounted on the beams and providing, in conjunction therewith, a frame structure, a stationary knife mounted transversely on said frame structure, a plurality of rotary knives mounted on the frame structure and adapted for coaction with the stationary knife, shields for the knives, each shield including a pair of bars connected at spaced points to the first named bars and terminating in downwardly curved rear end portions, plates mounted on the last named bars, substantially V-shaped braces extending between said last named bars and the beams, and means for actuating the rotary blades.

CLARENCE SLATER.